US010670484B2

(12) United States Patent
Pusheck (10) Patent No.: US 10,670,484 B2
(45) Date of Patent: Jun. 2, 2020

(54) PRESSURE SENSOR UNIT INCLUDING SNAP FIT CIRCULAR SEAL

(71) Applicant: VEONEER US INC., Southfield, MI (US)

(72) Inventor: Jacob Pusheck, West Bloomfield, MI (US)

(73) Assignee: VEONEER US INC., Southfield, MI (US)

( * ) Notice: Subject to any disclaimer, the term of this patent is extended or adjusted under 35 U.S.C. 154(b) by 208 days.

(21) Appl. No.: 15/935,444

(22) Filed: Mar. 26, 2018

(65) Prior Publication Data

US 2019/0293511 A1    Sep. 26, 2019

(51) Int. Cl.
| | |
|---|---|
| *G01L 19/00* | (2006.01) |
| *F16L 21/02* | (2006.01) |
| *F16L 37/084* | (2006.01) |
| *G01D 11/24* | (2006.01) |
| *F16J 15/10* | (2006.01) |
| *G01L 19/14* | (2006.01) |

(52) U.S. Cl.
CPC ............ *G01L 19/0038* (2013.01); *F16J 15/10* (2013.01); *F16L 21/02* (2013.01); *F16L 37/084* (2013.01); *G01D 11/245* (2013.01); *G01L 19/147* (2013.01)

(58) Field of Classification Search
CPC ..... G01L 19/0038; G01L 19/147; F16J 15/10; F16L 21/02; F16L 37/084; G01D 11/245; G01D 11/30; H01C 10/10
See application file for complete search history.

(56) References Cited

U.S. PATENT DOCUMENTS

| | | | | |
|---|---|---|---|---|
| 5,184,107 A | * | 2/1993 | Maurer | G01L 19/0084 29/621.1 |
| 8,302,484 B2 | | 11/2012 | Henzler et al. | 73/756 |
| 8,528,413 B2 | | 9/2013 | Seitz et al. | 73/753 |
| 8,931,348 B2 | | 1/2015 | Kunert | |
| 9,194,413 B2 | | 11/2015 | Christoph et al. | |
| 9,260,071 B2 | | 2/2016 | Murray, Jr. et al. | |
| 9,360,348 B2 | | 6/2016 | Henzler et al. | |

(Continued)

FOREIGN PATENT DOCUMENTS

| | | | | |
|---|---|---|---|---|
| DE | 102013208537 | | 7/2014 | ............. G01L 11/00 |
| EP | 2938986 | | 11/2015 | ............. G01L 10/06 |
| WO | WO2009/077269 | | 6/2009 | ............. B29C 45/16 |

*Primary Examiner* — Lisa M Caputo
*Assistant Examiner* — Nigel H Plumb
(74) *Attorney, Agent, or Firm* — Christopher P. Maiorana, PC (57) ABSTRACT

An apparatus includes a base assembly, a gasket and a housing assembly. The base assembly may have a locking feature and a bearing feature. The locking feature may have a first passage in communication with an exterior of the apparatus. The gasket may be mounted on the base assembly and may have (i) a compression region, (ii) a central region and (iii) a second passage in communication with the first passage. The housing assembly may have a sealing feature and may be configured to hold a sensor. The sealing feature (a) may mate with the bearing feature and (b) may compress the gasket in the compression region. The sensor (a) may seal to the central region of the gasket and (b) may be in communication with the exterior of the apparatus through the first passage and the second passage.

18 Claims, 10 Drawing Sheets

(56) References Cited

U.S. PATENT DOCUMENTS

| | | |
|---|---|---|
| 9,714,851 B2 | 7/2017 | Bertsch et al. |
| 10,161,769 B2 * | 12/2018 | Woernle ............... G01D 11/245 |
| 2013/0192361 A1 | 8/2013 | Herderich et al. |
| 2014/0137656 A1 * | 5/2014 | Henzler ............... G01D 11/245 |
| | | 73/756 |
| 2016/0204525 A1 | 7/2016 | Herrmann et al. |
| 2017/0343395 A1 | 11/2017 | Woernle et al. ................ 11/245 |
| 2019/0301959 A1 * | 10/2019 | Pusheck ................. G01L 23/32 |

* cited by examiner

PRESSURE SENSOR UNIT INCLUDING SNAP FIT CIRCULAR SEAL

FIELD OF THE INVENTION

The invention relates to vehicle sensors generally and, more particularly, to a method and/or apparatus for implementing a circular snap fit pressure sensor unit.

BACKGROUND

Sensors are used for many different operations within a vehicle. In an example, occupant restraint and safety systems typically sense changes in pressure at key points within the vehicle. Sensors are conventionally packaged with supporting electronics and typically mounted on a printed circuit board. The printed circuit board is then mounted into a housing or directly to a vehicle structure. Such mounting can cause a number of problems related to manufacturing and reliability.

It would be desirable to implement a circular snap fit pressure sensor unit.

SUMMARY

The invention concerns an apparatus including a base assembly, a gasket and a housing assembly. The base assembly may have a locking feature and a bearing feature. The locking feature may have a first passage in communication with an exterior of the apparatus. The gasket may be mounted on the base assembly and may have (i) a compression region, (ii) a central region and (iii) a second passage in communication with the first passage. The housing assembly may have a sealing feature and may be configured to hold a sensor. The sealing feature (a) may mate with the bearing feature and (b) may compress the gasket in the compression region. The sensor (a) may seal to the central region of the gasket and (b) may be in communication with the exterior of the apparatus through the first passage and the second passage.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a circular snap fit pressure sensor unit that may (i) employ a circular gasket surface to improve sealing performance, (ii) allow for a lower package size, (iii) allow for simplified terminals, (iv) be easier to manufacture than conventional designs, (v) allow manufacturing costs to be reduced, (vi) lower the stress on plastic housings, (vii) provide a secure gasket sealing interface, (viii) establish a watertight environment for a sensor, (ix) properly orient the sensor, (x) provide a poke yoke arrangement such that a housing assembly cannot be placed backwards into a base assembly, (xi) incorporate one or more integrated circuits and/or (xii) be implemented using one or more plastic assembly fabrication techniques.

A current push in industry is to reduce costs and complexity of automotive safety sensors. To accomplish the reductions, embodiments of the invention generally provide a low-cost solution for a pressure sensor unit. A one-product one-process methodology may be employed to create a family of pressure sensor units suitable for multiple installation criteria in multiple types of vehicles. The methodology generally uses a common housing assembly with one or more different attachment pieces that make the pressure sensor units complete. The housing assembly and a base assembly may be connected by way of snap fit and/or plastic weld methods. The base assembly and a mounting assembly may be connected by a rotational interlock. Mass production of a singular type of housing assembly may allow the cost to be reduced. The method generally allows for a simple manufacturing method with low initial equipment investment and very short cycle times.

Figure 1:
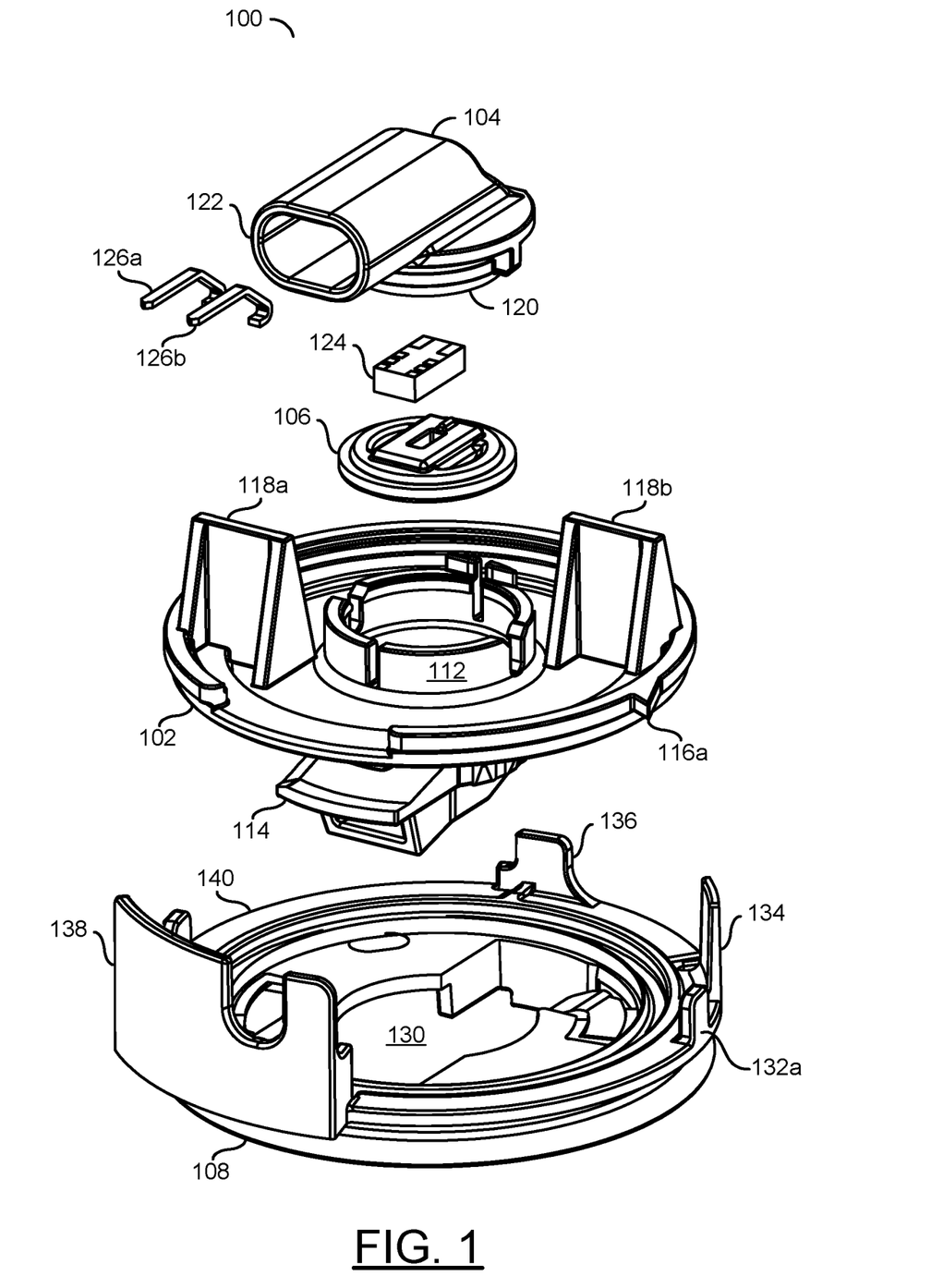
FIG. 1 is a diagram of a sensor unit in accordance with an embodiment of the invention.

Referring to FIG. 1, a diagram of a sensor unit 100 is shown in accordance with an embodiment of the invention. The sensor unit (or apparatus, or system, or device) 100 generally implements a gas pressure sensor suitable for use in automotive applications. The sensor unit 100 generally comprises a base assembly 102, a housing assembly 104, a gasket 106 and a mounting assembly 108.

The base assembly 102 may include a bearing feature 112, a locking feature 114, one or more teeth 116a-116b, and multiple brackets 118a-118b. A passage may be formed through the base assembly 102 and the locking feature 114. The base assembly 102 may be formed of a hard plastic material and has a generally circular shape. The materials used to fabricate the base assembly 102 may include, but are not limited to, polybutylene terephthalate (PBT) and nylon, and are usually glass filled. The base assembly 102 may be fabricated by injection molding.

The bearing feature 112 may implement multiple walls. The bearing feature 112 may form a ring around the gasket 106. The bearing feature 112 is generally operational to engage (e.g., snap to) the housing assembly 104. In various embodiments, the snapping (or locking) may not be reversible. In other embodiments, the bearing feature 112 may be configured to both engage with and disengage from the housing assembly 104 a number of times.

The locking feature 114 may implement a gas coupler (or fitting). The locking feature 114 may be configured to engage and lock to the mounting assembly 108. In various embodiments, the locking feature 114 may provide a surface to connect a hose or pipe containing the gas pressure signal to be measured by the pressure sensor unit 100. In other embodiments, the locking feature 114 may be directly exposed to an environment inside or outside the vehicle such that the pressure sensor unit 100 is directly measuring the surrounding (e.g., external) environmental pressure.

In various embodiments, the base assembly 102 may be configured to secure the pressure sensor unit 100 to a structure of a motor vehicle (e.g., automobile, truck, train and the like). The base assembly 102 may be customized to meet the mounting criteria of a particular application. The uniqueness of the base assembly 102 may result in a family of base assemblies 102. The housing assembly 104 may be interchangeable among different styles of base assemblies 102. Each type of base assembly 102 may have a common set of features to connect with a single type of housing assembly 104, and a unique set of features to account for the different installation criteria.

The housing assembly 104 may include an annular sealing feature 120, a connector 122, a sensor 124 and multiple terminals 126a-126b. The housing assembly 104 may be formed of the same hard plastic material used to create the base assembly 102. The sealing feature 120 may be configured to form an environmental seal with the gasket 106 while the housing assembly 104 is mated to the base assembly 102. The sealing feature 120 may also be configured to engage with the bearing feature 112 to hold the housing assembly 104 to the base assembly 102. The connector 122 may be configured to connect to an external electrical connector. The terminals 124a-124b may be configured to convey electrical power to a sensor 124 and electrical signals from the sensor 124.

The housing assembly 104 may support the sensor 124. The sensor 124 may be configured to sense a gas (or pneumatic or air) pressure signal. The gas pressure signal may be received from an exterior of the pressure sensor unit 100, through the passage of the base assembly 102, and through another passage through the gasket 106. The pressure sensor 124 is generally operational to convert a measured gas pressure into an electrical signal. The pressure sensor 124 may be fabricated as one or more integrated circuits. Electrical power for the pressure sensor 124 may be received through the terminals 126a-126b in the connector 122. Measured data generated by the pressure sensor 124 may be transferred out of the pressure sensor unit 100 through the terminals 126a-126b of the connector 122.

The gasket 106 is generally circular in shape. The gasket 106 may comprise a compression (or annual) region, a sloped (or angled) region and a central (or raised) region. A passage (or vent) may extend through the gasket 106, including the central region, and align with the passage in the base assembly 102 and the locking feature 114. The gasket 106 may be mounted on the base assembly 102 within the bearing feature 112. The gasket 106 is generally operational to seal an interior of the housing assembly 104 to the base assembly 102. The gasket 106 may also be operational to seal an active side of the sensor 124 from the interior of the housing assembly 104.

The mounting assembly 108 generally comprises an opening 130, one or more tabs 132a-132b, a deformable locking boss 134, a rigid over-travel stop 136 and a shield 138. The mounting assembly 108 may be formed of the same hard plastic material used to create the base assembly 102 and/or the housing assembly 104.

The opening 130 may be shaped to receive the locking feature 114 of the base assembly 102. The tabs 132a-132b may be positioned to engage the teeth 116a-116b of the base assembly 102 when the base assembly 102 is rotated relative to the mounting assembly 108. The element 134 may support locking of the base assembly 102 to the mounting assembly 108. The element 136 may provide an over-travel stop barrier so that the base assembly 102 may not be rotated too far. The shield 138 may be used to retain a harness connector engaged with the connector 122 while the base assembly 102 is locked with the mounting assembly 108. The shield 138 may include a notch 140 that allows the harness to be routed in-line with the connector 122 thus avoiding sharp bends.

In various embodiments, the mounting assembly 108 may secure the pressure sensor unit 100 to a structure of a motor vehicle. The mounting assembly 108 may be customized to meet the mounting criteria of a particular application. The uniqueness of the mounting assembly 108 may result in a family of mounting assemblies 108. The base assembly 102 may be interchangeable among different styles of mounting assemblies 108. Each type of mounting assembly 108 may have a common set of features to connect with one or more types of base assemblies 102, and a unique set of features to account for the different installation criteria.

Figure 2:
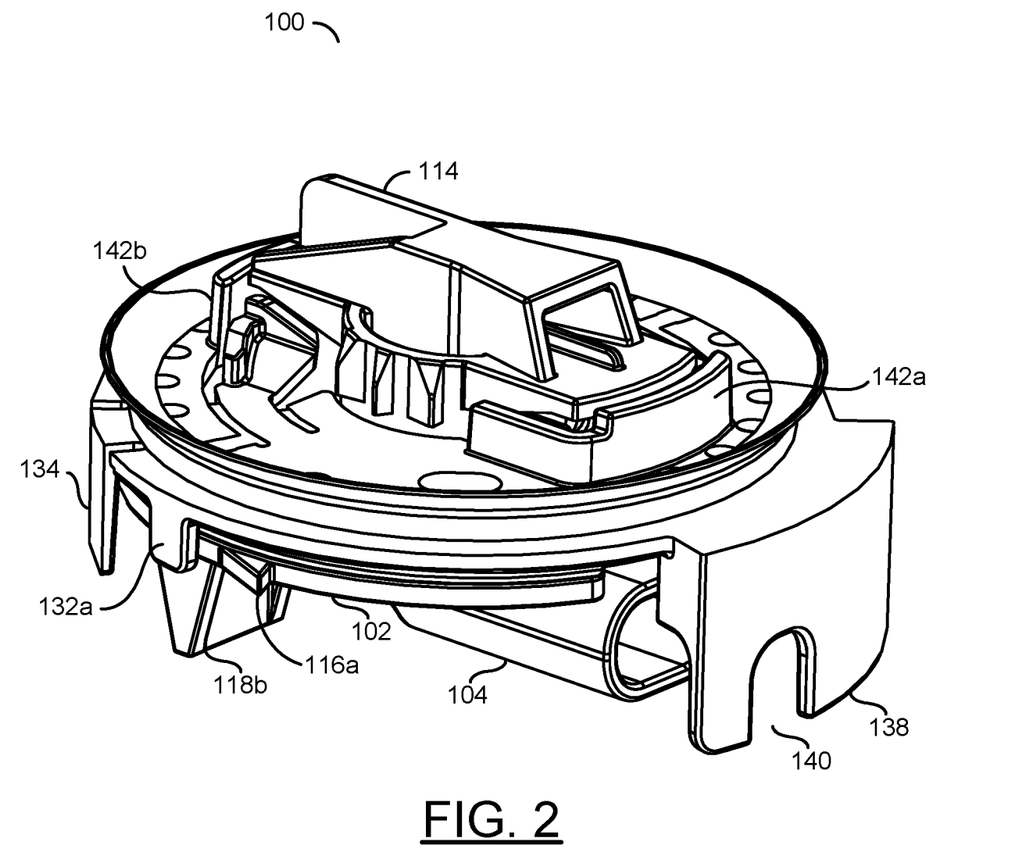
FIG. 2 is a diagram illustrating a perspective view of the sensor unit of FIG. 1 in accordance with an embodiment of the invention.

Referring to FIG. 2, a diagram illustrating a perspective view of the pressure sensor unit 100 is shown in accordance with an embodiment of the invention. While the base assembly 102 is mated to the mounting assembly 108, the locking feature 114 may extend through the mounting assembly 108 and protrude out a far side. Rotation of the base assembly 102 relative to the mounting assembly 108 generally causes the locking feature 114 to rotate into a locked position (as illustrated). Rotation of the locking feature 114 may be limited by one or more mechanical stops 142a-142b of the mounting assembly 108. The side of the pressure sensor unit 100 show in FIG. 2 generally illustrates a "wet" side that may be exposed to an exterior of the vehicle.

Figure 3:
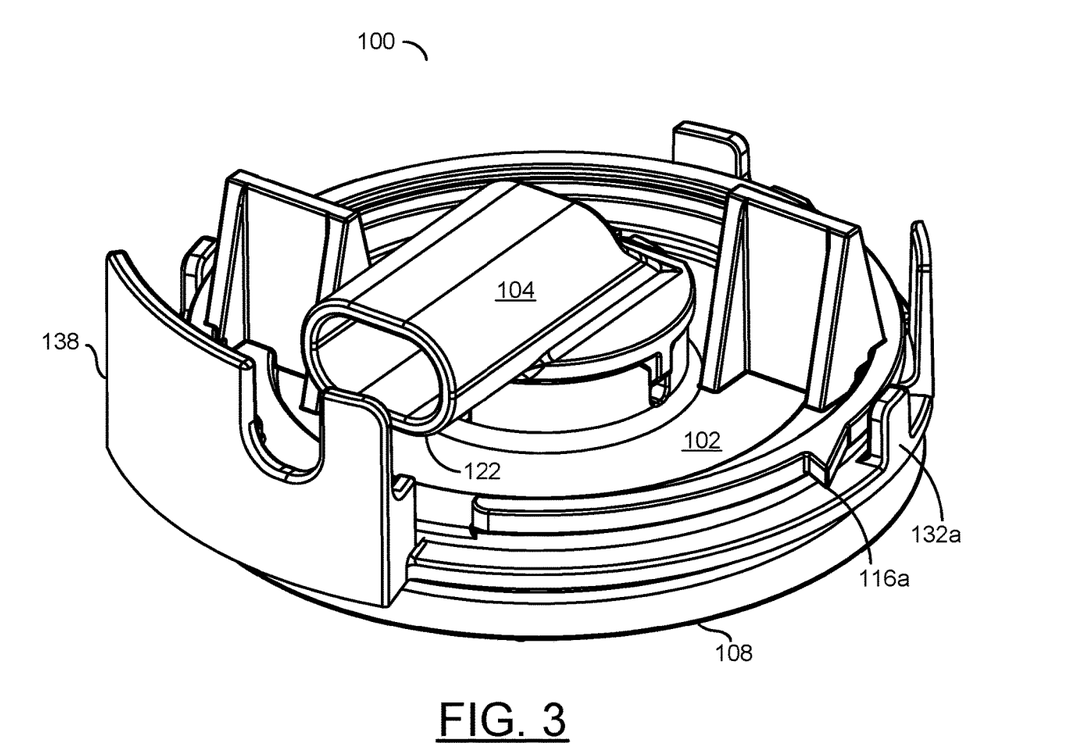
FIG. 3 is a diagram illustrating another perspective view of the sensor unit of FIG. 1 in accordance with an embodiment of the invention.

Referring to FIG. 3, a diagram illustrating another perspective view of the pressure sensor unit 100 is shown in accordance with an embodiment of the invention. A shipping (or uninstalled) state is illustrated. In an installed state, the teeth 116a-116b of the base assembly 102 may engage the tabs 132a-132b of the mounting assembly 108 to lock the two assemblies together. The side of the pressure sensor unit 100 show in FIG. 3 generally illustrates a "dry" side that may be exposed to an interior of the vehicle.

Figure 4:
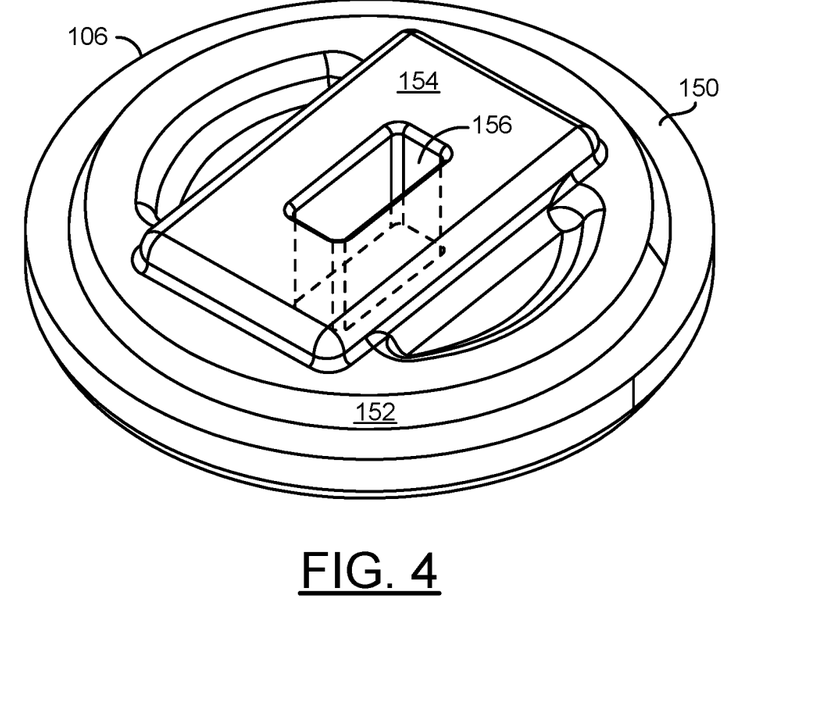
FIG. 4 is a diagram illustrating a gasket in accordance with an embodiment of the invention.

Referring to FIG. 4, a diagram illustrating an example implementation of the gasket 106 is shown in accordance with an embodiment of the invention. The gasket 106 is generally circular in shape. The gasket 106 generally comprises a compression (or annual) region 150, a sloped (or angled) region 152 and a central (or raised) region 154. A passage (or vent) 156 may extend through the gasket 106, including the central region 154.

The compression region 150 generally extends around an outer perimeter of the gasket 106. The sloped region 152 may extend around the gasket 106 inside the compression region 150. The angled surface of the sloped region 152 may increase a sealing force as a pressure differential rises, thereby making the seal more reliable.

The central region 154 may be offset perpendicular to the compression region 150 projected toward the sensor 124. The central region 154 is generally has a rectangular shape. An open face of the central region 154 may align and seal to the sensor 124 while the housing assembly 104 is connected to the base assembly 102.

The passage 156 may be aligned at one end with the passage in the base assembly 102. The passage 156 may be aligned at the opposite end with an active side of the pressure sensor 124. In various embodiments, the gasket 106 may be fabricated from a resilient material. The gasket 106 may be fabricated using a two-shot injection molding onto the base assembly 102, fabricated separately and subsequently placed on the base assembly 102, or fabricated by any common techniques. Material for the gasket 106 may include, but is not limited to silicone-based material, thermoplastic elastomers (TPE) material and thermoplastic rubber material. Other materials may be implemented to meet the design criteria of a particular application. An overall thickness of the gasket 106 may range from approximately 2 millimeters (mm) to approximately 5 mm. Additional details about the gasket 106 may be found in co-pending U.S. application Ser. No. 15/924,896, filed Mar. 19, 2018, and Ser. No. 15/928,430, filed Mar. 22, 2018 which are hereby incorporated by reference in their entirety.

Figure 5:
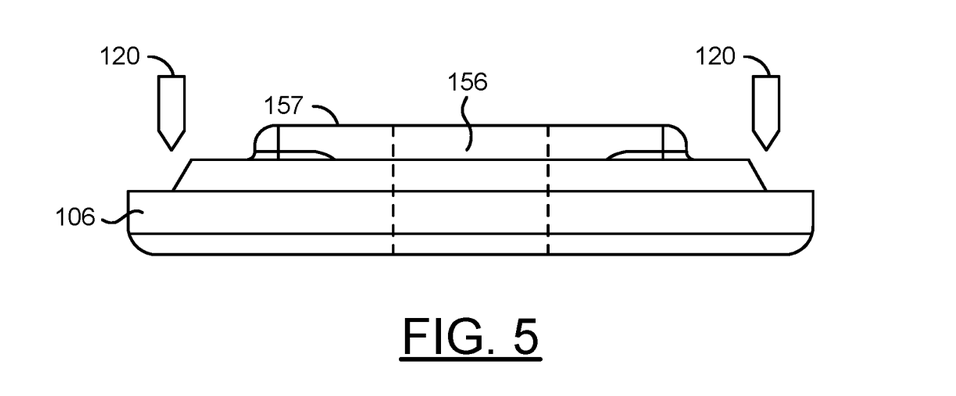
FIG. 5 is a diagram illustrating a side view of the gasket and a sealing feature in accordance with an embodiment of the invention.

Referring to FIG. 5, a diagram illustrating a side view of the gasket 106 and the sealing feature 120 is shown in accordance with an embodiment of the invention. The sealing feature 120 may be aligned with the compression region 150. The sealing feature 120 may extend slightly onto the sloped region 152.

Figure 6:
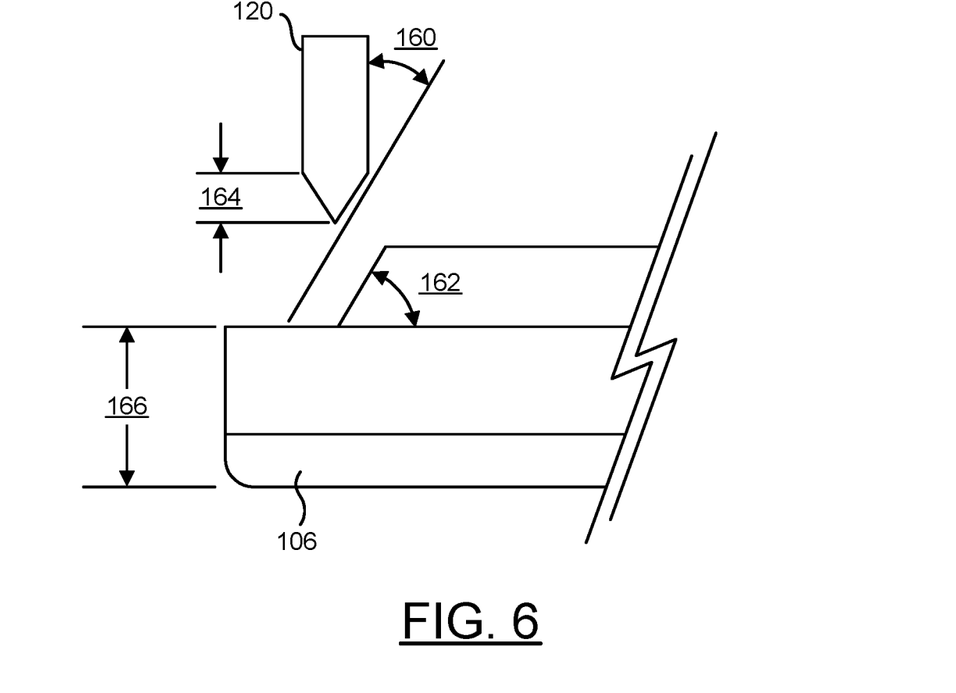
FIG. 6 is a diagram illustrating a close-up side view of the gasket and the sealing feature in accordance with an embodiment of the invention.

Referring to FIG. 6, a diagram illustrating a close-up side view of the gasket 106 and the sealing feature 120 is shown in accordance with an embodiment of the invention. The sealing feature 120 may have a taper. In various embodiments, an angle 160 of the taper may range from approximately 20 degrees to approximately 40 degrees as measured from a side of the sealing feature 120. The taper is generally parallel to the sloped region 152 in the gasket 106. In some embodiments, the sloped region 152 may have an angle 162 ranging from approximately 50 degrees to approximately 70 degrees relative to a radial plane of the circular gasket 106.

In various embodiments, the tapered portion of the sealing feature 120 generally extends a distance 164 that ranges from approximately 1.2 mm to approximately 1.5 mm from a free end. Other taper distances may be implemented to meet the design criteria of a particular application. A thickness 166 of a portion of the gasket 106 aligned to the sealing feature 120 may range from approximately 1.2 mm to approximately 1.8 mm. Other thicknesses of the gasket 106 may be implemented to meet the design criteria of a particular application.

Figure 7:
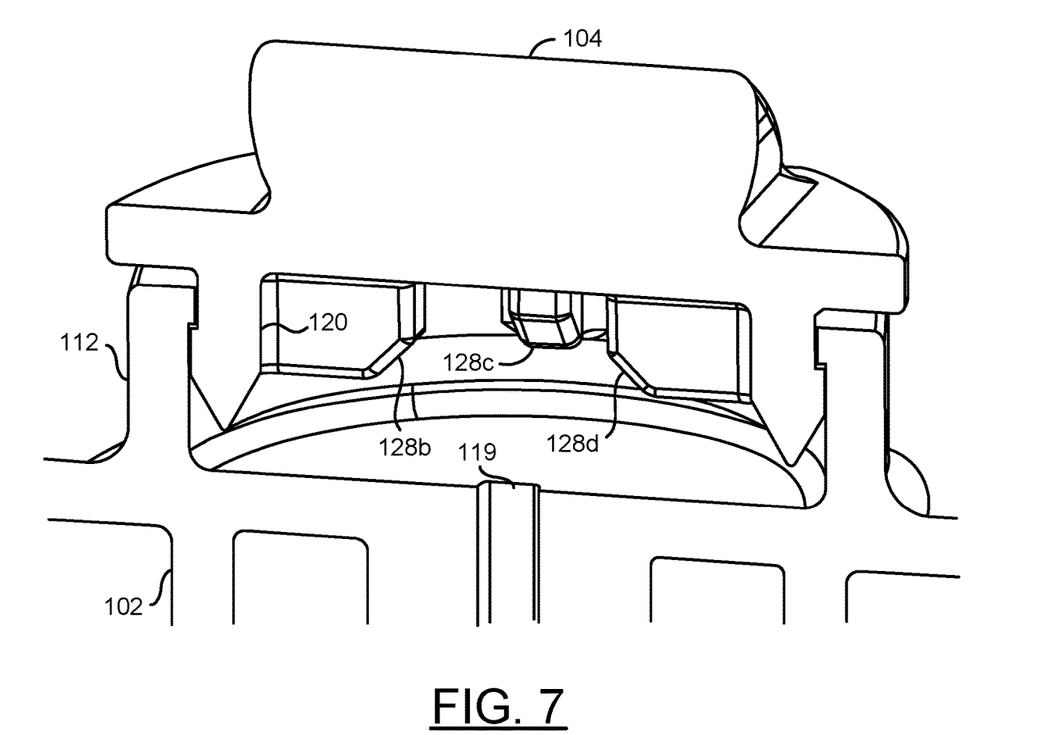
FIG. 7 is a diagram illustrating a cross-sectional view of a portion of a housing assembly snapped to a base assembly without the gasket in accordance with an embodiment of the invention.

Referring to FIG. 7, a diagram illustrating an example cross-sectional view of a portion of the housing assembly 104 snapped to the base assembly 102 without the gasket 106 is shown in accordance with an embodiment of the invention. The housing assembly 104 and the base assembly 102 may form a cavity in which the gasket 106 (not shown) and the sensor 124 (not shown) reside. The sealing feature 120 and the bearing feature 112 may interlock (or snap) to hold the assemblies together. The sensor 124 may be oriented and held in place by multiple posts 128a-128e (128b-128d shown). A passage 119 in the base assembly 102 may provide a route to bring the gas pressure to the sensor 124. The passage 119 may align with the passage 136 in the gasket 106 (see FIG. 4).

Figure 8:
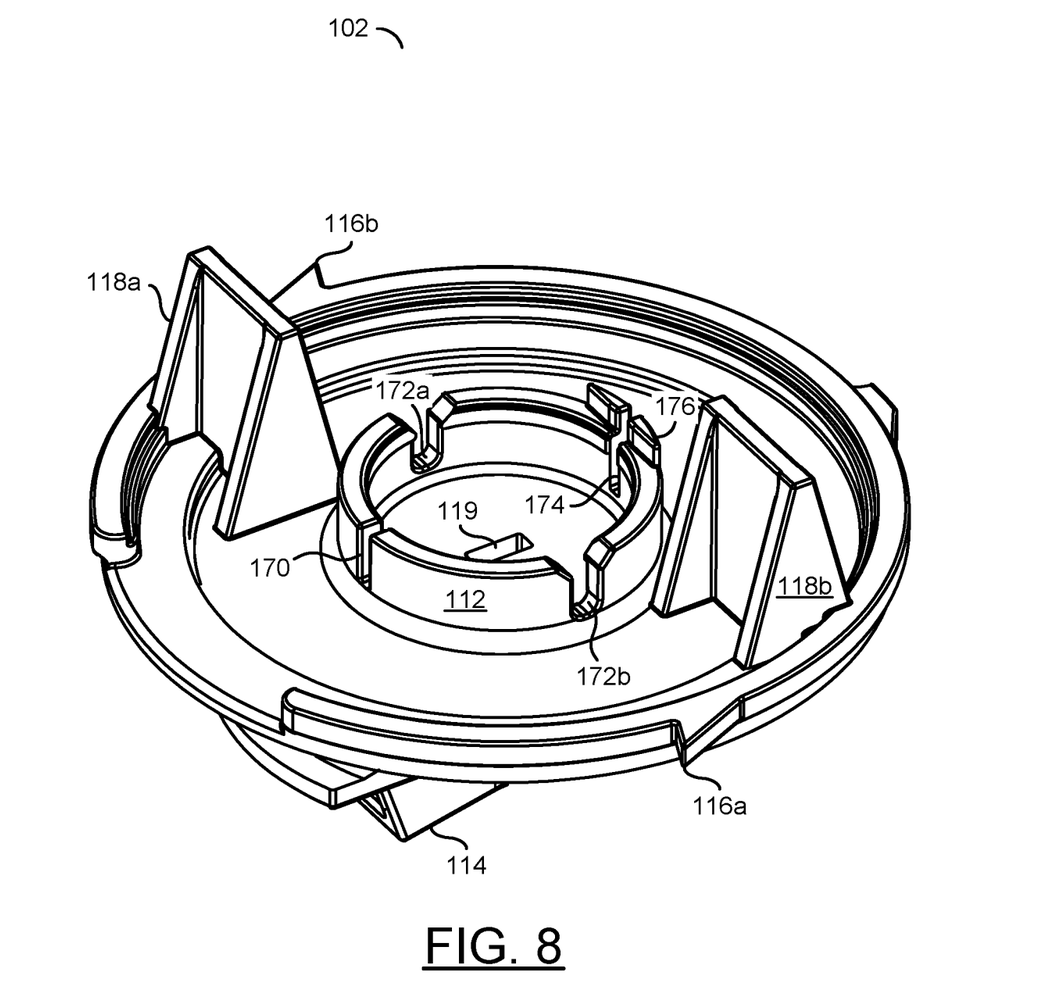
FIG. 8 is a diagram illustrating the base assembly alone in accordance with an embodiment of the invention.

Referring to FIG. 8, a diagram illustrating an example implementation of the base assembly 102 is shown in accordance with an embodiment of the invention. The bearing feature 112 of the base assembly 102 may be divided into multiple (e.g., four) segments. Slots 170, 172a-172b and 174 may be spread around the bearing feature 112. The slots 170-174 generally allow the segments of the bearing feature 112 to deform (or flex) as the rigid sealing feature 120 is forced into the center of the bearing feature 112. In various embodiments, the bearing feature 112 may be rigid and the sealing feature 120 may be deformable.

Multiple (e.g., two) slots 172a-172b may be used for alignment of the housing assembly 104 to the base assembly 102. The slots 172a-172b may be wider than the slots 170 and 174 to prevent some improper orientations (e.g., rotated ±90 degrees) between the housing assembly 104 and the base assembly 102. A key 176 may be included neighboring the slot 174. The key 176 generally prevents improper orientations (e.g., rotated ±90 and/or 180 degrees) between the housing assembly 104 and the base assembly 102.

Figure 9:
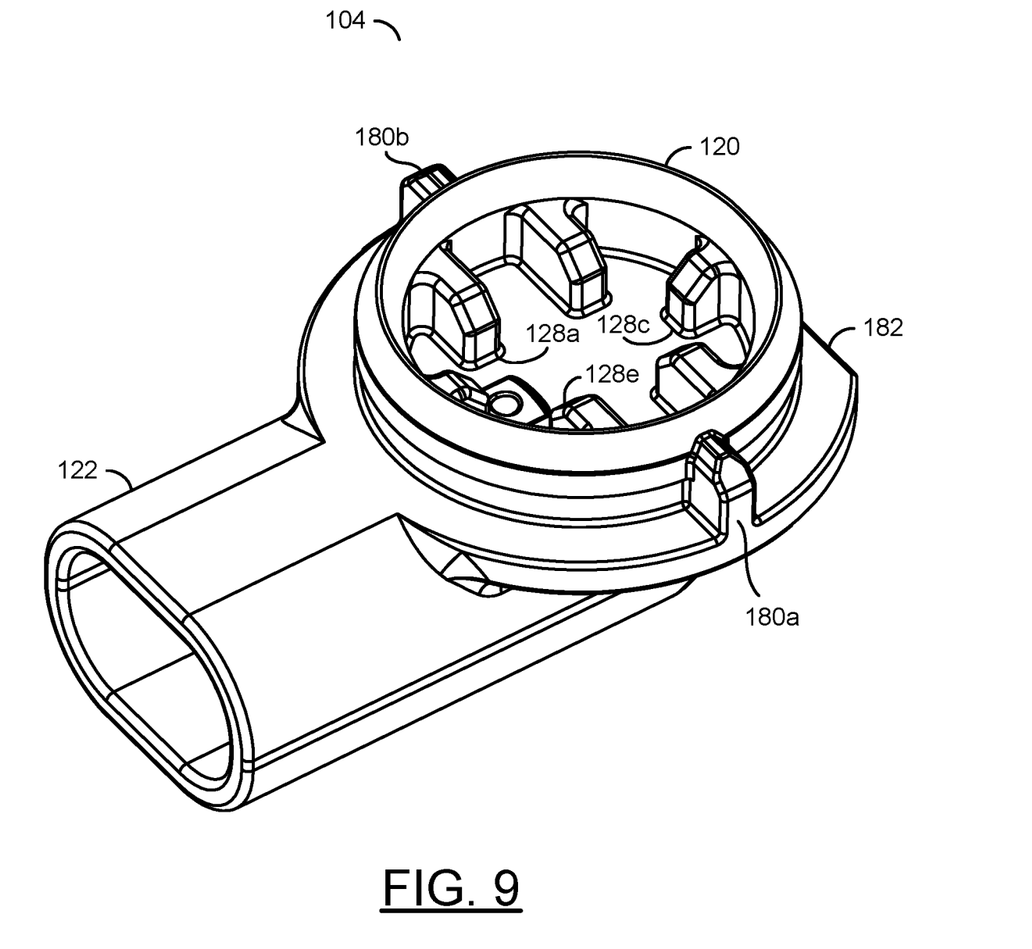
FIG. 9 is a diagram illustrating the housing assembly alone in accordance with an embodiment of the invention.

Referring to FIG. 9, a diagram illustrating an example implementation of the housing assembly 104 is shown in accordance with an embodiment of the invention. The housing assembly 104 may include the posts 128a-128e and multiple (e.g., two) alignment features 180a-180b. The posts 128a-128e may be configured to orient and hold the sensor 124 in a proper location to both contact the terminals 128a-128b (see FIG. 1) and connect with the passage 156 in the gasket 106 (see FIG. 4). The posts 128a-128e may ensure that the sensor 124 interfaces with the electrical and mechanical contact locations in the correspondingly correct locations on the sensor 124.

While the housing assembly 104 is mated to the base assembly 102, the alignment features 180a-180b may reside within the slots 172a-172b of the bearing feature 112. An edge 182 of the housing feature 104 may be shaped to allow clearance of the key 176 while the housing assembly 104 is properly orientated to and mated to the base assembly 102. If an attempt is made to attach the housing assembly 104 to the base assembly 102 out of the proper orientation, the key 176 may contact the connector 122. The contact may prevent the sealing feature 120 from properly seating in the bearing feature 112. The slots 172a-172b with the alignment features 180a-180b, and/or the key 176 with the edge 182 generally allows the housing assembly 104 and the base assembly 102 to connect in a single orientation.

Figure 10:
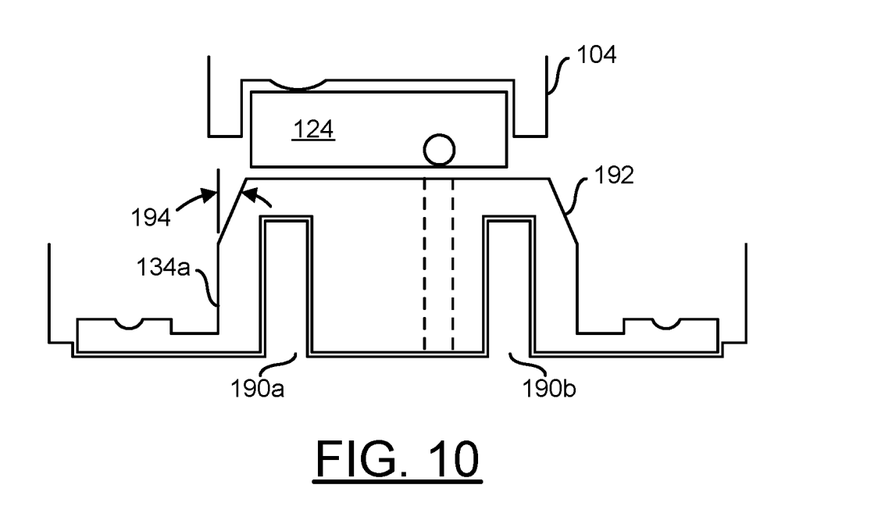
FIG. 10 is a diagram illustrating a central region of the gasket in accordance with an embodiment of the invention.

Referring to FIG. 10, a diagram illustrating an example design of another central region 134a of the gasket 106 is shown in accordance with an embodiment of the invention. The central region 134a may be a variation of the central region 134. The central region 134a may include slots for multiple embedded posts 190a-190n and an angled portion 192.

The embedded posts 190a-190n may be aligned with the outer edges of the sensor 124. The embedded posts 190a-190n may be operational to provide additional support (or stiffness) in the central region 134a. In various embodiments, the embedded posts 190a-190n may be fabricated from plastic as part of the base assembly 102 and the central region 134a of the gasket 106 formed around the posts 190a-190n. In some embodiments, the embedded posts 190a-190n may be fabricated as part of the gasket 106 prior to mounting to the base assembly 102.

The angled portion 192 may expand the size of the central region 134a to accommodate the embedded posts 190a-190n. The angled portion 192 may be formed at an angle 194 in a range of 5 degrees to 60 degrees as measured from a wall of the central region 134a. Other angles may be implemented to meet the design criteria of a particular application.

Figure 11:
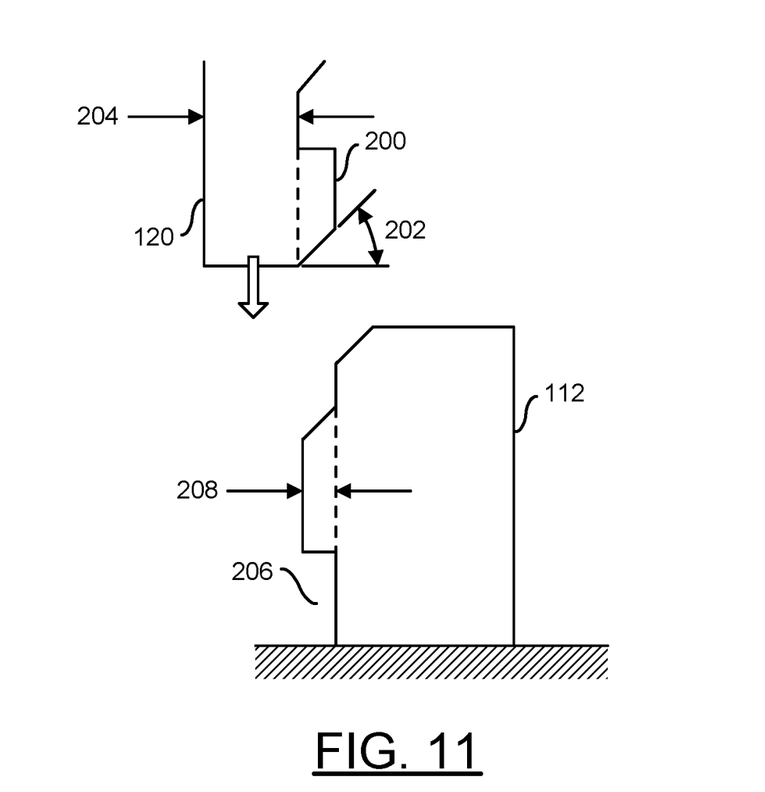
FIG. 11 is a diagram illustrating a sealing feature aligned to a bearing feature in accordance with an embodiment of the invention.

Referring to FIG. 11, a diagram illustrating an example detailed design of the sealing feature 120 and the bearing feature 112 is shown in accordance with an embodiment of the invention. The sealing feature 120 may include an annular ridge 200 around an outside perimeter. A leading edge of the ridge 200 may be shaped at an angle 202 relative to a plane at the end of the sealing feature 120. In various embodiments, the angle 202 may range from approximately 50 degrees to approximately 70 degrees. The sealing feature 120 may have a thickness 204. The thickness 204 may range from approximately 1 mm to approximately 3 mm. Other angles and/or thicknesses may be implemented to meet the design criteria of a particular application.

The bearing feature 112 may include an annular notch 206 around an inside perimeter. The notch may have an undercut (or depth) 208. The undercut 208 may range from approximately 0.1 mm to approximately 0.5 mm. Other undercut dimensions may be implemented to meet the design criteria of a particular application.

A mating force (W) to snap fit the housing assembly 104 together with the base assembly 102 may be given by formula 1 as follows:

$$W = P \times ((\mu + \tan(\alpha))/(1 - \mu \times \tan(\alpha))) \quad (1)$$

Where P may be a transverse force, μ may be a friction coefficient and α may be the lead angle 202. A strain (E) caused by the ridge 200 during the insertion into the bearing feature 112 may be given by formula 2 as follows:

$$E = 100\% \times (y/d) \quad (2)$$

Where y may be twice the undercut distance 208 and d may be a diameter of the joint. By way of example, for an undercut distance 208 of 0.2 mm (e.g., y=0.4 mm) and a diameter d of 15.4 mm, the strain E may be 100%×(0.4/15.6)=2.56%.

Figure 12:
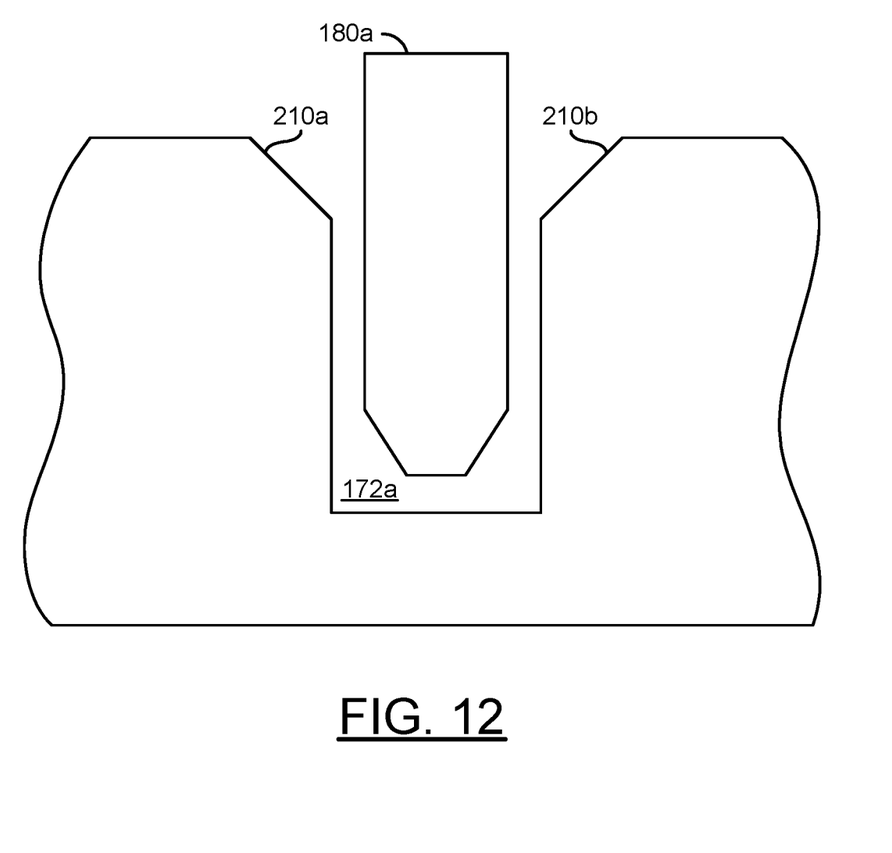
FIG. 12 is a diagram illustrating a slot and an alignment feature in accordance with an embodiment of the invention.

Referring to FIG. 12, a diagram illustrating an example implementation of the slot 172a and the alignment feature 180a is shown in accordance with an embodiment of the invention. The slot 172a of the base assembly 102 may be shaped to accept the alignment feature 180a of the housing assembly 104. An open end of the slot 172a may include beveled edges 210a-210b. The beveled edges 210a-210b may widen the slot 172a at the open end. In various embodiments, the free end of the alignment feature 180a may be tapered. The widened opening and tapered free end may assist in guiding and centering the alignment feature 180a in the slot 172a. Likewise, the slot 172b may have beveled edges shaped to accept and guide the alignment feature 180b.

The structures illustrated in the diagrams of FIGS. 1 to 12 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Data signals generated by the sensor units (or devices) may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a base assembly comprising a locking feature and a circular bearing feature, wherein said locking feature has a first passage in communication with an exterior of said apparatus;
   a gasket comprising a circular compression region, a rectangular central region, and a second passage, wherein said gasket is mounted on said base assembly within said circular bearing feature such that said second passage is in communication with said first passage; and
   a housing assembly comprising a circular sealing feature and configured to hold a sensor, wherein (i) said circular sealing feature mates with said circular bearing feature and compresses said circular compression region of said gasket, and (ii) said sensor is sealed to said rectangular central region of said gasket such that said sensor is in communication with said exterior of said apparatus through said first passage and said second passage.

2. The apparatus according to claim 1, wherein said housing assembly snap fits to said base assembly.

3. The apparatus according to claim 1, wherein said sensor comprises a gas pressure sensor.

4. The apparatus according to claim 1, wherein said sensor measures an air pressure inside a motor vehicle.

5. The apparatus according to claim 1, further comprising a mounting assembly having an opening configured to receive said locking feature and a plurality of tabs distributed around a periphery of said mounting assembly.

6. The apparatus according to claim 5, wherein said base assembly further comprises a plurality of teeth distributed around a periphery of said base assembly and is secured to said mounting assembly by passing said locking feature of said base assembly through said opening of said mounting assembly and rotating said base assembly relative to said mounting assembly until said plurality of teeth engage said plurality of tabs.

7. The apparatus according to claim 5, wherein at least one of said base assembly and said mounting assembly is customized to one of a plurality of motor vehicles.

8. The apparatus according to claim 1, wherein said circular bearing feature surrounds said circular sealing feature and snap fits to said circular sealing feature.

9. The apparatus according to claim 8, wherein said circular sealing feature has a ridge around an outer perimeter and said circular bearing feature have a notch configured to snap fit to said ridge.

10. The apparatus according to claim 8, wherein said circular sealing feature is rigid and said circular bearing feature is deformable to conform to said circular sealing feature.

11. The apparatus according to claim 8, wherein said circular bearing feature is rigid and said circular sealing feature is deformable to conform to said circular bearing feature.

12. The apparatus according to claim 8, wherein said circular sealing feature has one or more alignment features and said circular bearing feature has one or more slots configured to receive said alignment features.

13. The apparatus according to claim 12, wherein each of said slots has a widened opening configured to guide said alignment features into said slots.

14. The apparatus according to claim 1, wherein said housing assembly further has a plurality of alignment features configured to align said sensor with said second passage.

15. The apparatus according to claim 1, wherein said base assembly further has a key configured to limit said housing assembly to a single orientation when connected to said base assembly.

16. The apparatus according to claim 1, further comprising a plurality of posts embedded in said rectangular central region of said gasket and configured to stiffen said rectangular central region, wherein said rectangular central region has an angled portion that widens said gasket about said posts.

17. An apparatus comprising:
a base assembly comprising a locking feature, a plurality of teeth distributed around a periphery of said base assembly, and a circular bearing feature, wherein said locking feature has a first passage in communication with an exterior of said apparatus;
a mounting assembly having an opening configured to receive said locking feature and a plurality of tabs distributed around a periphery of said mounting assembly, wherein said base assembly is secured to said mounting assembly by passing said locking feature of said base assembly through said opening of said mounting assembly and rotating said base assembly relative to said mounting assembly until said plurality of teeth engage said plurality of tabs;
a gasket comprising a circular compression region, a rectangular central region, and a second passage, wherein said gasket is mounted on said base assembly within said circular bearing feature such that said second passage is in communication with said first passage; and
a housing assembly comprising a circular sealing feature and configured to hold a sensor, wherein (i) said circular sealing feature mates with said circular bearing feature and compresses said circular compression region of said gasket and (ii) said sensor is sealed to said rectangular central region of said gasket such that said sensor is in communication with said exterior of said apparatus through said first passage and said second passage.

18. The apparatus according to claim 17, wherein said housing assembly snap fits to said base assembly and said sensor comprises a gas pressure sensor configured to measure a pressure inside a motor vehicle.

* * * * *